Sept. 28, 1954 W. L. VAN DAM 2,690,084
SPRING BELT TENSION EQUALIZER FOR MACHINE TOOLS
Filed Aug. 1, 1950
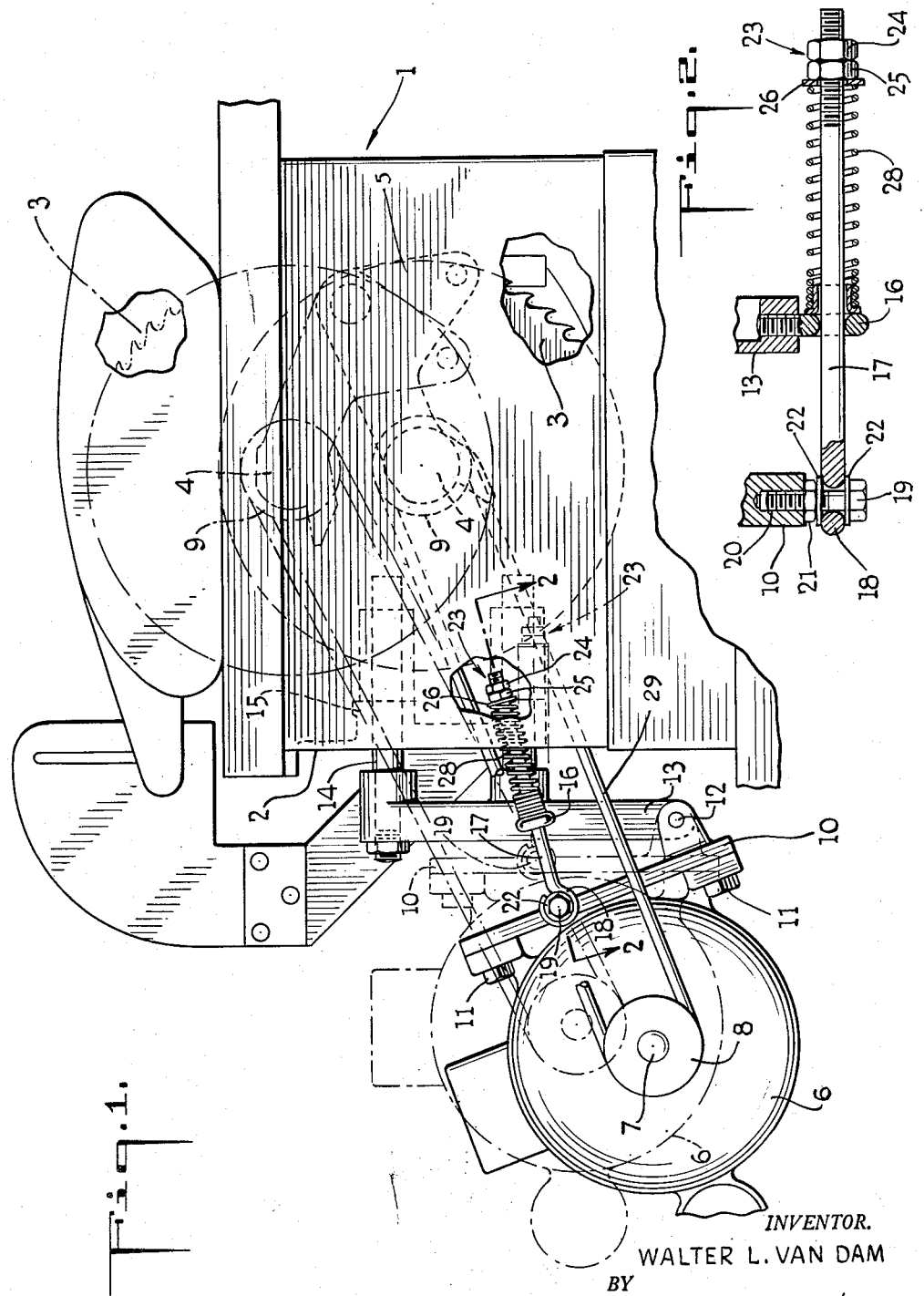
INVENTOR.
WALTER L. VAN DAM
BY
Kenyon & Kenyon
ATTORNEYS Patented Sept. 28, 1954

2,690,084

UNITED STATES PATENT OFFICE 2,690,084

SPRING BELT TENSION EQUALIZER FOR MACHINE TOOLS

Walter L. Van Dam, Kalamazoo, Mich., assignor to Atlas Press Company, Kalamazoo, Mich., a corporation of Michigan Application August 1, 1950, Serial No. 176,933

2 Claims. (Cl. 74—242.13)

This invention relates to machine tools such as saws and particularly to belt driven tools and means for maintaining belt tension and equalizing it, particularly on tools in which the driven tool is moved to a plurality of adjusted positions.

Heretofore it has been common practice to mount the driving motor on a hinged base so disposed that the weight of the motor and the base could serve to maintain tension on a belt throughout a plurality of positions but such an arrangement has not been satisfactory because the forces involved have varied for different positions of the motor and base and in some positions the forces have been so great that excessive tension has resulted.

The main object of the present invention is to overcome this difficulty and to provide a machine tool such as a saw with an adjustable arbor and with a drive which maintains and equalizes tension through the medium of a hinged motor base and in which the variations in forces involved in such an arrangement are overcome by a simple, inexpensive addition to the combination.

Other objects and advantages will appear from the following description and from the drawings in which:

Fig. 1 is a side elevation of a saw embodying the invention, and

Fig. 2 is a detailed sectional view taken on line 2—2 of Fig. 1.

The machine tool which is a saw is indicated generally at 1. It has a frame 2, a saw 3 mounted on an arbor 4 and means 5 for raising and lowering the arbor. These means are not shown in detail, since the details thereof form no part of the invention since the saw arbor may be raised and lowered in many ways while employing the invention. In Fig. 1 the saw and arbor are shown in raised position in dot-and-dash lines and in lowered position in dotted and full lines where appropriate.

The drive for the saw consists of a motor 6 which has a shaft 7 parallel to the arbor 4 and which carries a driving pulley 8 which is aligned with a driven pulley 9 on the arbor 4. The motor 6 is mounted on a base 10 by bolts 11. The base is hinged or pivoted on a horizontal line at 12 to an adjustable hanger 13 which may be considered as part of the frame 2 and is adjustable in or out by sliding movement of slides 14 in bearings 15.

Belt tension is maintained by outward swinging of the motor 6 and base 10 for the various positions of the arbor 4 as shown in Fig. 1, where the motor and base are shown in full line for the lowered position and in dot-and-dash lines for the raised position of the arbor. The pivot 12 is disposed below the line connecting the motor shaft 7 and the arbor 4 in the lowest position.

To compensate for the difference in tension applied by the motor 6 and base 10 in different positions, a spring means is provided between the hanger 13 and the base 10 which is loaded as the motor and base swing outwardly. This means consists of a bearing 16 swivelled in the hanger 13 and a rod 17 slideably received in the bearing 16 and which is pivoted at one end to the base 10 by means of a loop 18 formed in the rod 17 and the bolt 19 which is threaded into the base 10 as shown at 20 and is provided with lock nut 21 and washers 22.

A stop 23 is provided at the other end of the rod 17. It consists of a pair of nuts 24 and 25 and a washer 26. A compression coiled spring 28 surrounds the rod 17 and bears on the bearing 16 and the stop 23.

When the saw arbor 4 is in raised position the motor base 10 is in substantially vertical position, the belt 29 being of a length to bring this about. When the saw arbor 4 is lowered the motor 6 and base 10 swing, under influence of gravity, outwardly, as shown in Fig. 1, until the lowered position is reached. At this point the motor 6 and base 10 would exert greater tensioning effect on the belt 29 except for the spring equalizing means in which the spring 28 is loaded increasingly as the motor and base swing outwardly from raised to lowered position. This occurs because during outward swinging of the motor and mount the bearing 16 swivels so that the rod 17 may slide freely outwardly, tending to compress the spring 28 between bearing 16 and stop 23, thus opposing and equalizing the increased effect of gravity due to the position of the motor 6 and base 10.

It will be clear to those skilled in the art that other means than the specific means shown may be employed in practicing this invention and there is no intent to be limited to the specific form shown and described.

What is claimed is:

1. In a saw or the like having a frame, the combination of a vertically adjustable saw arbor, carrying a driven pulley, and means for driving said driven pulley and for maintaining and equalizing belt tension on said pulley comprising a motor having a shaft parallel to said arbor, and carrying a driving pulley aligned with said driven pulley, said motor being mounted on a substantially vertically disposed base pivoted to said frame on a line parallel to said arbor, said line being disposed below a line connecting said pulleys in all of their positions, said base being freely swingable from a substantially vertical position outwardly away from the arbor, and a belt trained over said pulleys and maintained under tension by the outward swinging of said base and motor, and of a length to connect said pulleys when the arbor is in raised position and the motor base is in substantially vertical position, and a tension equalizer comprising a bearing swivelled to said frame adjacent said motor base, a rod slideably received in said bearing and pivotally connected at one end to said base above its pivot, and having a stop at its other end and a compression spring between said bearing and stop.

2. In a machine tool having a frame, a belt drive for maintaining and equalizing tension, comprising a motor base hinged to the frame on a horizontal line, and swingable from a substantially vertical position to an outward position, whereby tension may be applied to a belt connected to a movable driven pulley, a bearing swivelled on said frame, a rod slideable in said bearing and pivoted at one end to said base, and having a stop at its other end and a compression spring between said bearing and stop, adapted to be loaded by outward swinging of said base to compensate for additional forces created by said swinging.

References Cited in the file of this patent

UNITED STATES PATENTS

| Number | Name | Date |
|---|---|---|
| 768,392 | Moskowitz | Aug. 23, 1904 |
| 1,135,767 | Cheshire | Apr. 13, 1915 |
| 1,234,685 | Nielsen et al. | July 24, 1917 |
| 1,324,136 | Turner | Dec. 9, 1919 |
| 1,723,077 | Richards | Aug. 6, 1929 |
| 2,168,282 | Tautz | Aug. 1, 1939 |
| 2,511,445 | Ruemelin | June 13, 1950 |

FOREIGN PATENTS

| Number | Country | Date |
|---|---|---|
| 565,896 | France | Feb. 5, 1924 |